UNITED STATES PATENT OFFICE.

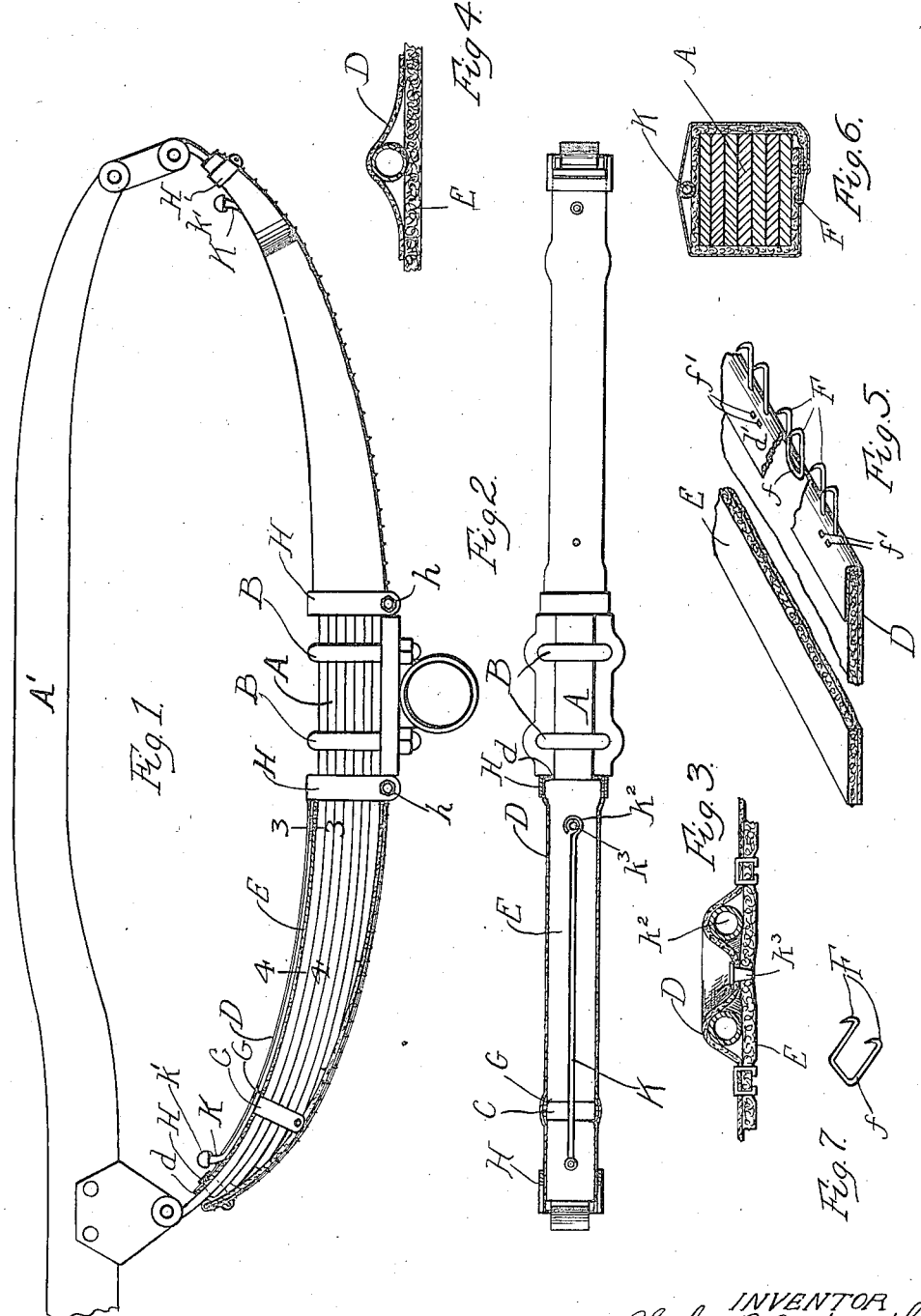

CHARLES B. WOODWORTH, OF NIAGARA FALLS, NEW YORK, ASSIGNOR TO WOOD-
WORTH MANUFACTURING CORPORATION, OF BINGHAMTON, NEW YORK.

SPRING-COVER.

1,380,858.     Specification of Letters Patent.     Patented June 7, 1921.

Application filed March 6, 1920. Serial No. 363,863.

*To all whom it may concern:*

Be it known that I, CHARLES B. WOOD-WORTH, a subject of the King of Great Britain, residing at Niagara Falls, in the county of Niagara and State of New York, have invented a new and useful Improvement in Spring-Covers, of which the following is a specification.

This invention relates to spring covers of the kind used on automobiles or other vehicles to cover the springs and keep the same lubricated.

The objects of this invention are to produce a spring cover which is so made that it will fit springs of a number of different sizes; also to provide spring covers of this kind with fastening devices of new and improved construction; also to improve the construction of spring covers by providing means for closing the ends of the covers so as to exclude water and other foreign matter and to retain the lubricant in the cover; also to provide spring covers with means of improved construction for introducing the lubricant to the spring; also to provide a spring cover of this kind which is so made as to improve the appearance of the vehicle springs; also to improve spring covers in other respects hereinafter specified.

In the accompanying drawings:—

Figure 1 is a side elevation of a vehicle spring provided with spring covers embodying the invention, one of the covers being shown in section.

Fig. 2 is a top plan view thereof, showing the outer layer of one of the covers removed.

Figs. 3 and 4 are fragmentary transverse sectional views on an enlarged scale on lines 3—3 and 4—4 Fig. 1.

Fig. 5 is a fragmentary sectional perspective view thereof showing the securing devices and the manner of fastening the same to the cover.

Fig. 6 is a transverse sectional view of a spring with a cover in place thereon.

Fig. 7 is a perspective view of one of the fastening members of the cover, detached from the cover.

A represents one of the springs of a vehicle which may be secured to the frame A' of the vehicle in any desired manner. The spring, as usual, consists of a plurality of leaves which are secured together at their middle portions by means of the usual clamps B and spring clips C are also preferably used to hold the leaves of the spring together. All of these parts may be of any usual or suitable construction and of themselves form no part of this invention.

The spring covers each include an outer casing or covering member D of impervious material and an inner pad or lining E of felt or other absorbent material, the ends of the outer casing being turned over the edges of the pad as shown at $d$ and one side edge of the casing being turned over the corresponding edge of the felt as shown at $d'$, so that when the cover is in place no parts of the felt pad will be visible or exposed. The outer casing or covering may be made of oil cloth, imitation leather or of any other material which will be more or less impervious to water and oil so that the casing will serve the purpose of excluding water or other foreign matter from the spring and will also keep the oil in the pad or inner layer of the spring cover. The pad is preferably made of felt but any other material which will absorb oil or other lubricant and transmit it to the spring leaves may be used.

The spring cover is preferably made of such form as to extend around the spring and the opposite side edges thereof are then overlapped and secured together, as shown in Fig. 6. The means for securing the edges together are preferably constructed as follows:—Along one edge of the spring cover, preferably along the edge on which the outer covering is turned over as shown at $d'$, a plurality of hooks F are secured to the spring cover in any suitable manner, for example, the hooks may be formed by bending over the ends of staples or U-shaped members $f$, the legs of which extend through the bent over edges of the outer covering and the body portions of which are arranged within the folded edge of the outer layer or casing of the cover, as shown in Fig. 6. The ends of the legs of the staples are bent over to form the hooks F which penetrate the other side of the casing and thereby hold the cover in place on a spring. In order to hold the staples in place in the outer casing of the cover, rivets $f'$ are preferably used which are placed immediately in back of the staples and which serve the further purposes of securing the casing and the pad of the cover together and of holding the turned over portions $d'$ in place. Since the hooks can engage any portion of the cover, it will be evident that a cover which is wider than necessary can be readily applied to a spring by overlapping the edges of the cover to a greater or less extent. Consequently it is not necessary to make a special sized cover for every different spring, since one size of cover can be used on a plurality of sizes of springs. This greatly simplifies the marketing of these covers, since dealers are not obliged to have on hand as many different sizes of covers to meet the customers' demands, as is the case with covers which must fit a spring accurately in order to be useful.

In order to have the spring covers present a neat appearance when secured to a spring, it is desirable to eliminate or correct as much as possible the projection or unevenness caused by the spring clips. This is accomplished by cutting away parts of the pad or inner layer of the spring cover as shown at G, Figs. 1 and 2, at the points where the spring clips are located or where other projecting parts of the spring occur. Since the two layers of the spring covers are secured together at one edge of the cover, the cutting away of parts of the inner layer will not disconnect the two parts of the cover. By means of this cutting away of parts of the felt or inner layer, the projections which would otherwise occur on the cover when in place on the spring are either entirely eliminated or else greatly reduced, so that the spring with the cover in place presents a neat appearance.

Means are also preferably provided for rigidly securing the end portion of the cover to the spring so as to hold the cover securely in place and prevent water or other foreign matter from entering between the cover and spring at the ends of the cover. Any suitable means may be provided for this purpose, rigid clamping members H being preferably provided which are made of a shape adapted to press all portions of the ends of the cover tightly against the spring. These clamps are preferably made of metal and are so formed that they will securely press the ends of the cover against all four sides of the spring and thus positively prevent the passage of oil or water beyond the ends of the cover. In the construction shown the clamps are made of a single piece of metal bent to conform to the shape of the spring and the ends thereof are connected by means of a bolt or the like $h$.

It is also desirable to provide means for lubricating the spring without necessitating the removal of the cover from the spring. This is accomplished in the construction shown by means of a perforated tube or conduit K, which is preferably arranged between the two layers or parts of the spring cover. The tube K in the construction shown has a receiving end $k$ which extends out through the outer casing of the cover into a position in which oil or other lubricant may be easily introduced into the tube and this end of the tube may be closed by any suitable means, such for example as a cap $k'$. The tube in the construction shown is provided at its other end with a loop shaped portion $k^2$ through which a rivet or other securing means $k^3$ passes and serves to hold this end of the tube in place. Any other means for holding the tube in place may, however, be used. This tube is preferably made of a ductile metal which will not be injured by the flexing or yielding of the spring. By introducing the oil through the tube it is distributed substantially throughout the length of the spring cover and saturates the felt so that the lubricant will be supplied to all parts of the spring. Other means for introducing lubricant may be provided if desired.

The spring covers shown keep the springs well lubricated so that the springs at all times will yield freely and will not stiffen up due to the rusting of the leaves or to the excessive friction between leaves caused by the introduction of grit or other foreign matter between the leaves. The spring covers present a neat appearance when in place on the spring and to a certain extent hide the projecting parts, such as spring clips, owing to the cutting away or omitting parts of the pad. The fastening devices described are particularly desirable since the two longitudinal edges of the spring cover can overlap to any desired extent, so that one size of cover may be used on springs of a number of different sizes. Perforating the casing by means of the hooks does not injure the cover since it is seldom necessary to remove the spring cover, the lubrication being effected through the perforated tube. This tube has the advantage of distributing the lubricant to all parts of the spring through the medium of the pad. The rigid end clamps are very much more desirable than straps or other flexible end closing devices since the rigid clamps hold the ends securely against all faces of the springs and thus exclude water from the spring and also prevent the lubricant from getting out.

I claim as my invention:

1. A spring cover having an outer casing made of impervious material and a pad made of absorbent material, and securing means fastened to one of the longitudinal edges of said outer casing and adapted to engage with any portion of the outer casing to hold the cover on a spring.

2. A spring cover having an outer casing made of impervious material and a pad made of absorbent material, and hooks secured to one of the longitudinal edges of said outer casing and adapted to engage with any portion of the casing for holding the cover on a spring.

3. A spring cover having an outer casing made of impervious material and a pad made of absorbent material, and securing means comprising a plurality of substantially U-shaped members having their ends extending through holes in one of the longitudinal edges of said cover, said ends being provided with hooked portions adapted to engage the opposite edge portions of the cover to hold the cover on a spring.

4. A spring cover including an outer casing made of impervious material and a pad of absorbent material, one of the longitudinal edges of said casing being folded over and secured to said pad to hold the pad in place with regard to said casing, and hooked fastening members secured in said folded edge and adapted to engage any portion of the casing to hold the parts of the cover in place.

5. A spring cover including an outer casing made of impervious material and a pad of absorbent material, one of the longitudinal edges of said casing being folded over the adjacent edge of the pad, fastening members held in place in said folded edge and adapted to engage any portion of said casing to hold said cover on a spring, and securing means which secure said folded portion of the casing to said pad and which hold said fastening members in said folded edge.

6. A spring cover having an outer casing of impervious material and a pad of absorbent material, the ends of said casing and one of the longitudinal edges thereof being folded over the adjacent portions of said pad, and fastening devices secured to said longitudinal edge of the casing and adapted to engage with any portion of the casing when said cover is arranged around the spring, said folded longitudinal edge overlapping said other edge, whereby no portion of the pad is exposed.

7. A spring cover having an outer casing of impervious material and a pad of absorbent material, and a perforated tube which extends lengthwise of said cover and through which a lubricant may be introduced to the spring.

8. A spring cover having an outer casing of impervious material and a pad of absorbent material and a perforated tube which extends lengthwise of said cover and is arranged between said casing and said pad and through which lubricant may be introduced to said pad.

9. A cover adapted to be secured about a spring, a perforated tube which extends lengthwise of said cover and through which a lubricant may be introduced to the spring, said tube having one end thereof extending out of said cover and adapted to receive lubricant, and means for closing said end of the tube.

10. A cover adapted to be secured about a spring, a perforated tube which extends lengthwise of said cover and through which a lubricant may be introduced to the spring, and means for securing said tube to said cover.

11. A cover adapted to be secured about a spring, a perforated tube which extends lengthwise of said cover and through which a lubricant may be introduced to the spring, one end of said tube projecting through said cover and the other end being bent to form a loop, and fastening means extending through said cover and said loop for holding said tube in place on said cover.

12. A spring cover having an outer casing of impervious material and a pad of absorbent material adapted to contain a lubricant, the ends of said casing being folded over the adjacent ends of said pad to confine the lubricant in said cover.

13. A spring cover having an outer casing of impervious material and a pad of absorbent material, the ends of said casing being folded over the adjacent ends of the pad to confine said pad within said cover, rigid clamping members adapted to press said ends into contact with said spring, and means for securing one of the longitudinal edges of said cover to the opposite edge portion thereof when the cover is secured around the spring.

14. A cover adapted to be secured around a spring and to have its longitudinal edges overlap to any extent, one of the longitudinal edges of said cover being folded over, fastening members secured at one of their ends in said folded edge and provided at their other ends with hooks which are adapted to engage any portion of said cover, and means for securing said folded edge to the adjacent part of the cover, said means also holding said fastening members in place.

15. A cover adapted to be secured about a spring and a perforated tube which extends lengthwise of said cover and through which a lubricant may be introduced to the spring.

16. A spring cover adapted to be adjusted to springs of varying widths and thicknesses by overlapping the longitudinal edges to any desired extent so that only one edge is exposed, and means for holding the overlapping edge in place.

17. A spring cover having two longitudinal edges and adapted to be adjusted to springs of varying widths and thicknesses by overlapping the longitudinal edges so that only one of said edges is exposed, and means attached to said cover for holding said exposed edge in place.

Witness my hand this 4th day of March, 1920.

CHARLES B. WOODWORTH.

Witnesses:
F. E. PROCHNOW,
M. J. PITMAN.